United States Patent [19]

Sugama et al.

[11] 4,361,670

[45] Nov. 30, 1982

[54] QUICK SETTING WATER-COMPATIBLE FURFURYL ALCOHOL POLYMER CONCRETES

[75] Inventors: Toshifumi Sugama, Ridge; Lawrence E. Kukacka, Port Jefferson; William H. Horn, Brookhaven, all of N.Y.

[73] Assignee: The United States of America as represented by the United States Department of Energy, Washington, D.C.

[21] Appl. No.: 260,623

[22] Filed: May 5, 1981

[51] Int. Cl.$^3$ .............................................. C08L 37/00
[52] U.S. Cl. ..................... 524/811; 524/849; 525/270
[58] Field of Search ............... 260/42.53, 29.2 UA; 526/270, 238; 252/429 R; 524/811, 849

[56] References Cited

U.S. PATENT DOCUMENTS

| | | |
|---|---|---|
| 2,399,055 | 4/1946 | Nordlander . |
| 2,909,450 | 10/1959 | Goldstein . |
| 3,220,970 | 11/1965 | Carlström et al. ............ 260/37 |
| 3,487,043 | 12/1969 | Grudus ........................ 526/270 |
| 3,943,084 | 3/1976 | Hess ........................... 526/270 |
| 4,175,067 | 11/1979 | Kottke et al. ............ 260/42.53 |
| 4,197,225 | 4/1980 | Emmons et al. .......... 260/42.53 |

OTHER PUBLICATIONS

Hess, 54th Annual Fall Technical Conference of the Soc. of Petroleum Engineers of AIME, Sep. 23–26, 1979, SPE 8213 (1979).

Primary Examiner—Allan Lieberman

[57] ABSTRACT

A novel quick setting polymer concrete composite comprising a furfuryl alcohol monomer, an aggregate containing a maximum of 8% by weight water, and about 1–10% trichlorotoluene initiator and about 20–80% powdered metal salt promoter, such as zinc chloride, based on the weight of said monomer, to initiate and promote polymerization of said monomer in the presence of said aggregate, within 1 hour after mixing at a temperature of $-20°$ C. to $40°$ C., to produce a polymer concrete having a 1 hour compressive strength greater than 2000 psi.

11 Claims, No Drawings

4,361,670

QUICK SETTING WATER-COMPATIBLE FURFURYL ALCOHOL POLYMER CONCRETES

BACKGROUND OF THE INVENTION

The United States Government has rights in this invention pursuant to Contract Number DE-AC02-76CH00016, between the United States Department of Energy and Associated Universities, Inc.

The present invention relates to quick setting polymer concrete compositions having compressive strength in excess of 2000 psi within one hour after mixing furfuryl alcohol monomer, about 1–10% trichlorotoluene initiator and about 20–80% zinc chloride promoter by weight of the monomer with wet or frozen aggregate containing 0–8% water.

The prior art discloses furfuryl alcohol and filler-containing formulations, particularly useful as a slow setting jointing mass for sulfite digesters and floor bricklaying, using a catalyst consisting of plaster of Paris and a strong acid such as sulfuric acid, which effects slow solidification of the composition, as disclosed in U.S. Pat. No. 3,220,970. A method of delaying the setting (polymerization) of an acid settable liquid such as furfuryl alcohol is also disclosed in U.S. Pat. No. 3,943,084, wherein a latent catalyst system comprising a mixture of acid releasing compound such as trichlorotoluene and a base such as pyridine is used in the formation of a furfuryl alcohol plug in the bore of an oil well. U.S. Pat. No. 2,909,450 also discloses a furfuryl alcohol-containing composition comprising a zinc chloride catalyst, in the form of a storage-stable aqueous solution at room temperature, to be used as an impregnator for porous and fibrous materials by heating the impregnated material to temperatures of 60°–105° C. to effect polymerization. All of aforesaid patents disclose slow setting or delayed setting furfuryl alcohol compositions; whereas the present novel furfuryl alcohol-containing compositions are quick setting, within one hour after mixing with wet or dry aggregate, in order to facilitate rapid repair of deteriorated runways, bridges and highways.

Vinyl-type monomers such as methymethacrylate (MMA), styrene (St) and ester-type unsaturated polyester (UP) are commonly used as organic binders in conjunction with dry aggregate to produce polymer concrete (PC). These systems are being widely applied as rapid repair materials for deteriorated cement concrete bridge decks and highways, and as a construction material for pipes, slabs, wall panels, etc. Wet aggregate cannot be used with these monomers due to the extremely low strengths that are produced. In contrast, with the present invention the furfuryl alcohol (FA), combined with the trichlorotoluene initiator and metal salt promoter, such as zinc chloride, exhibits high compression strength polymer concretes (in excess of 2000 psi) within one hour after mixing. Comparative results using the polymer concrete composition of the present invention and the known vinyl-type monomers are shown in Table 1.

TABLE 1

| 1 Hour and 24 Hour Compressive Strengths of FA, MMA, and UP Polymer Concrete Containing Wet Aggregate (8% Water Content) | | |
|---|---|---|
| | Compressive Strength in psi at 24° C. | |
| Polymer Concrete | 1 hr | 24 hr |
| FA | 3300 | 4500 |
| MMA | 0 | 1270 |
| UP | 0 | 830 |

SUMMARY OF THE INVENTION

The object of the present invention is to solve disadvantages found with existing systems by providing quick setting, water-compatible furfuryl alcohol polymer concrete compostions.

Another object of the present invention is to provide furfuryl alcohol polymer concrete compositions of high compressive strengths, above about 2000 psi, within one hour after mixing the monomer with the aggregate, over the wide temperature range of −20° C. to 40° C.

Still another object of the present invention is to provide a furfuryl alcohol polymer concrete of improved fire resistance.

Another object is to provide a rapid repair material for deteriorated asphalt and concrete roadways, bridges and the like.

Additional objects, advantages, and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with purposes of the present invention, as embodied and broadly described herein, the novel polymer concrete composition of this invention comprises about 8–20% weight of furfuryl alcohol monomer, about 78–92% by weight of an aggregate system containing 0–8% by weight water, about 1–10% $\alpha\alpha\alpha$-trichlorotoluene (TCT) by weight of said monomer and about 20–80% of a metal salt promoter, selected from the group consisting of $SnCl_4$, $ZnCl_2$ and $AlCl_3$, by weight of said monomer to initiate and promote rapid polymerization of said monomer in the presence of said aggregate. The properties of the composite are dependent upon the rate of polymerization and the degree of dryness of the aggregate.

More specifically, the present invention relates to a quick setting, water-compatible polymer concrete composition comprising about 8–20% by weight of a furfuryl alcohol monomer, a wet or frozen aggregate system containing 0–8% by weight water, and a catalyst system consisting of about 1–10% trichlorotoluene and about 20–80% metal salt, selected from the class consisting of $SnCl_4$, $ZnCl_2$ and $AlCl_3$, based on the weight of said monomer, to initiate and promote polymerization within one hour and at ambient temperatures within the range of −20° C. to 40° C., in the production of a polymer concrete having a one hour compressive strength greater than 2000 psi. At temperatures above 0° C., 8–10% by weight of polymer is preferred; whereas at temperatures below 0° C., 10–15% by weight is optimum because of the increase in the viscosity of said polymer below freezing. The surface area of the aggregate system is still another factor in determining the optimum amount of polymer.

Furfuryl alcohol (α-furylcarbinol) monomer is produced commercially by the catalytic hydrogenation of furfural which is produced from agricultural wastes such as corn cobs, oat hulls, etc. Therefore, furfuryl alcohol monomer is produced from a relatively stable supply source, which is low cost and energy conserving when compared to other conventional petroleum-based organic materials such as methylmethacrylate (MMA), styrene (St), and unsaturated polyester (UP), all commonly used in polymer concrete. When the above monomers are used to produce polymer concrete, it is necessary to use them in conjunction with aggregate systems containing water contents less than 1%; otherwise, extreme reductions in strength occur as shown in Table 1. The furfuryl alcohol monomer, unlike the vinyl-type monomer, has a OH group in its molecular structure which results in a strong affinity for moisture. As a result, it is advantageous to use furfuryl alcohol in combination with wet aggregate to produce a high-quality polymer concrete.

Still other advantages of using furfuryl alcohol (FA) monomer as a binder in polymer concrete are its inherent properties characterized by low vapor pressure (1 mm Hg at 31.8° C.), low viscosity (about 5 cP at 25° C.), which resembles the consistency of water, low flammability (1.8 to 16.3% in air in the temperature range of 72.5° to 122° C.), and solubility in water. In addition to its compatability with wet or frozen aggregate, the ability to cure at ambient temperature and to yield a product with a compressive strength greater than 2000 psi at an age of 1 hr are particularly desirable characteristics for applications in the rapid repair of deteriorated aircraft runways, and asphalt and concrete bridge decks and highways.

The condensation polymerization of FA is normally conducted using acidic-type initiators such as benzenesulfonic acid, p-toluenesulfonic acid, trichloroacetic acid, ααα-trichlorotoluene, αα-dichlorotoluene, α-chlorotoluene, and the like. In an attempt to develop a one-step curing process, Hess, [P. H. Hess, 54th Annual Fall Technical Conference of the Society of Petroleum Engineers of AIME, September 23-26 SPE 8213 (1979)] has measured the gel times at 25° C. of FA combined with these acidic-type initiators. He demonstrated that gelatins could be produced within 20 hr by the addition of benzenesulfonic acid, p-toluenesulfochloride, and ααα-trichlorotoluene (TCT).

It has been found that TCT shows catalytic effects brought about by a hydrolytic reaction with the water existing in fresh FA-PC prepared by mixing the FA monomer and wet aggregate. Accordingly, TCT is used as the acid-based initiator in this invention.

In addition to the use of the TCT initiator, the present invention also uses a metal salt promoter, which promotes rapid polymerization or curing at ambient temperatures, i.e., within one hour after mixing and preferably in 30 minutes. A metallic salt in the form of a finely divided dry powder and selected from the group consisting of $SnCl_4$, $ZnCl_2$ and $AlCl_3$ has been found to be effective in giving a 30 minute cure at about 24° C. Powdered $ZnCl_2$ is preferably used because of its low cost. The metallic salt promoter can either be dissolved first in water and then added to the composition, or added directly in dry form.

The aggregate system for the polymer concrete in accordance with this invention is non-basic, having a maximum pH of about 8, and is preferably a mixture of silica sands having a particle size of 1.19 to 0.149 mm combined with a dry silica flour filler having a particle size of less than 62 μm. Small quantities, up to about 10% by weight of aggregate, of other compatible non-basic fillers may be added such as mica, ferric oxide, carbon black, gypsum, etc. Cements such as portland cement and the like are too alkaline to be used herein. The amount of the aggregate system which includes the filler content is about 78-92% by weight of the total composition.

The method of preparing the quick-setting polymer concrete of the present invention comprises mixing a metal salt promoter with a dry or wet aggregate to achieve uniform distribution of said promoter salt in said aggregate; separately mixing furfuryl alcohol monomer with the trichlorotoluene initiator; mixing said aggregate mixture with said monomer mixture, at ambient temperatures of about −20° C. to 40° C., to effect polymerization of said furfuryl alcohol monomer in situ, and recovering a polymer concrete having a compressive strength about 2000 psi within one hour after the final mixing. The metal salt promoter is preferably zinc chloride which may be added directly to the wet or dry aggregate as a finely divided powder, or first dissolved in water and then added to the aggregate.

DETAILED DESCRIPTION OF THE INVENTION

The following examples are merely illustrative of the invention, and are not to be construed as limiting thereof.

In the following examples, the furfuryl alcohol used was a commercial grade supplied by the Quaker Oats Company.

Measurements of gel times, peak exothermic times, and peak temperatures for the FA-PC formulations were performed by inserting a thermocouple, which was connected to a strip chart recorder, into a test tube containing a 150 g mass of the PC. During polymerization the temperature was monitored on the recorder.

The shear bond strength was determined from the results of the shear strength at the interface between a 7.0-cm-diam.×3.0-cm-thick cement concrete cylinder and about 3.0-cm thickness of FA-PC which was cast against the smoothly finished concrete surface.

Water absorption was obtained by measuring the increase in weight of 2.2-cm-diam×4.4-cm-long specimens, which were previously dried at 100° C. to constant weight, after immersion in water for 7 days at 24° C.

The polymerization kinetics of FA-PC having a 2.5 and 5.0% by weight water content were determined by using a DuPont 910 Differential Scanning Calorimeter (DSC) with a heating rate of 10° C./min in $N_2$ gas. The DSC samples ranged in weight from 30 to 35 mg and were crushed to a size to pass through a 0.104-mm sieve. The area measurements of the exothermic peak which are representative of the condensation reaction of the polymer were made with a planimeter.

Flammability tests for FA-PC composites, 12.7 cm long×1.27 cm wide×0.6 cm thick, were performed according to ASTM D635-68, "Flammability of Self-Supporting Plastics".

EXAMPLE I

| Ingredients | % by Weight |
| --- | --- |
| Furfuryl alcohol monomer | 13.2 |
| ααα-trichlorotoluene | 1.0 |
| Aggregate mix *(7.5% water) | 63.2 |
| Dry silica flour (particle size less than 62 μm) | 15.7 |
| Powdered $ZnCl_2$ | 7.9 |

*Aggregate = 50% by weight No. 16 sand (size, 1.19 mm) - 25% by weight No. 30 sand (size, 0.595 mm) - 25% by weight No. 100 sand (size, 0.249 mm).

The powdered $ZnCl_2$ is added directly to the wet aggregate, and then mixed for approximately 2 minutes to achieve a uniform distribution and complete dissolution of the $ZnCl_2$. The dry silica flour is then mixed with the $ZnCl_2$—wet aggregate mixture by hand for about 2 minutes, followed by the addition of the mixture of FA and TCT initiator and finally mixed by hand for about 1 minute. The resultant FA-PC gels in 4 min. 45 sec., the exothermic polymerization reaching a peak temperature of 78° C.

EXAMPLE II

Example I was repeated except that the TCT content was increased to 1.5%, 2% and 3% respectively, resulting in gel times of about 7 min. 20 sec., 5 min. 20 sec. and 3 min. 20 sec. respectively; and reaching a peak exothermal temperature of 91° C., 98° C. and 101° C. respectively.

Typical temperature-time curves representing gel time, peak exotherm time, and peak temperatures for FA-PC specimens containing wet aggregate (7.5% water content) prepared by varying the amount of TCT initiator added while maintaining a constant FA monomer to $ZnCl_2$ promoter ratio of 10:6, said measurements performed in air at an ambient temperature of about 25° C., indicate that the gel and peak exotherm times are reduced with an increase in the amount of TCT initiator. The gel time of FA-PC specimens containing 3% by weight TCT is considerably shorter (3 min. 20 sec. vs 14 min. 45 sec.) than that of samples containing 1% by weight TCT. For use as a repair material, a gel time of at least 5 min. would be considered the minimum allowable work time. Therefore, the data suggests that a TCT initiator concentration of less than 2% by weight will be required at 24° C.

FA-PC thermograms are characterized by a very short interval between the gel time and the peak exotherm time which is representative of the end of curing. The time interval between the gel and cure points was measured to be about 2 min. The short curing times of FA-PC accelerated by the addition of the TCT initiator-$ZnCl_2$ promoter system can fully satisfy the rapid setting conditions required for use of the materials in rapid repair systems for bridge decks and highways where restoration of traffic within 2 hrs is often required.

These curves also indicate that the peak exotherm temperatures for FA-PC increase with an increase in the amount of TCT initiator. It is clear from the high exotherm temperature of greater than 90° C. that very energetic polymerization takes place when at least 1.5% by weight TCT initiator is used at about 24° C.

To determine the quantity of acidic TCT initiator required to obtain a compressive strength of greater than 2000 psi within 1 hr after mixing FA monomer with aggregate containing 7.5% by weight water, FA-PC specimens combined with different amounts of TCT were prepared according to the mix proportions indicated in Example I. The ratio by weight of FA monomer/$ZnCl_2$ promoter used was a constant 10:6.

The 1 hr compressive strength results at about 24° C. for FA-PC specimens containing a TCT content in the range of 0.6 to 3.0% by weight of FA monomer are given in Table 2, wherein the polymer concrete composition contains 13% monomer and 87% aggregate. The data indicates that the 1 hr strength of the specimens increases with an increase in the amount of TCT initiator, and a strength greater than 2000 psi is obtained by the addition of at least 1.0% by weight initiator. The maximum strength of 3650 psi was obtained when 3.0% weight initiator was used. However, the value shows an improvement in strength of only about 14.1% when compared with the 3200 psi obtained by the addition of only 1.5% by weight. Thus, 1.5% by weight is considered to be an optimum amount of TCT initiator of FA-PC at about 24° C. The gel time of greater than 7 min. and the strength of this formulation appear adequate for practical applications.

TABLE 2

The Effect of TCT Initiator Concentration on the 1 hour Compressive Strength of FA—PC Specimens Containing a Wet Aggregate Having 7.5% by Weight Water Content

| Specimen No. | Monomer-Initiator-Promoter Formulations, % by Weight | | | 1 hr Compressive Strength at 24° C., psi |
| --- | --- | --- | --- | --- |
| | FA | TCT | $ZnCl_2$ | |
| 1 | 100 | 0.5 | 60 | 1600 |
| 2 | 100 | 1.0 | 60 | 2500 |
| 3 | 100 | 1.5 | 60 | 3200 |
| 4 | 100 | 2.0 | 60 | 3500 |
| 5 | 100 | 3.0 | 60 | 3650 |

The 1 hour compressive strength of instant polymer concrete is also a function of the metal salt promoter, such as $ZnCl_2$, as shown in Table 3, using a composition of 13% monomer content and 87% aggregate by weight; wherein the results indicate that the compressive strengths increased with increased amounts of $ZnCl_2$. A minimum of 20% $ZnCl_2$ is required in order to obtain a 1 hour compressive strength of greater than 2000 psi, and the optimum amount of $ZnCl_2$ is 60% which yields the greatest percentage increase in compressive strength.

TABLE 3

The Effect of $ZnCl_2$ Promoter on the 1 Hour Compressive Strength of FA—PC Specimens Containing a Wet Aggregate Having 8% by Weight Water Content

| Specimen No. | Monomer-Initiator-Promoter Formulations, % by Weight | | | 1 hr Compressive Strength at 24° C., psi |
| --- | --- | --- | --- | --- |
| | FA | TCT | $ZnCl_2$ | |
| 1 | 100 | 5.0 | 10 | 890 |
| 2 | 100 | 5.0 | 20 | 2100 |
| 3 | 100 | 5.0 | 30 | 2900 |
| 4 | 100 | 5.0 | 60 | 4500 |
| 5 | 100 | 5.0 | 80 | 4550 |

In order to investigate the influence of the water content on the compressive strength of FA-PC, specimens having a water content (water (W)/aggregate (A)+water (W) ratio by weight) in the range of 0 to 10% by weight were prepared according to the compositions given in Example I. The TCT initiator content used was 1.5% by weight of FA monomer.

The 1 hr compressive strength results of FA-PC specimens indicate that the strength decreases with an increase in aggregate water content. The 1 hr compressive strength for FA-PC specimens prepared by directly adding the finely powdered $ZnCl_2$ promoter to the dry aggregate (0% water content) was determined to be 5,200 psi. The strength reduction that occurred when the water content was 2.5% by weight was about 5.8%, and the 5.0% by weight water content showed a reduction of about 17.3%. The 1 hr strength of 3200 psi obtained from the specimens in the presence of 7.5% by weight water corresponds to a reduction of about 38.5%. The maximum water content which will yield a strength greater than 2000 psi seems to be about 8.5% by weight. Although the aggregate may contain a water content of from 0-8%, it is believed that the superior initial strength of FA-PC is due to the significant accelerative effect of the TCT initiator-$ZnCl_2$ promoter combination on the polymerization process.

Table 4 also illustrates the decrease in compressive strength with an increase in the water content of the aggregate utilizing 3% TCT initiator, and indicates that a maximum water content of 8% in the wet aggregate is still effective in yielding a PC having a 1 hour compressive strength about 2000 psi.

TABLE 4

The Influence of Water Content Contained in an Aggregate on the 1 Hour Compressive Strength of 100% FA—3.0% TCT—60.0% $ZnCl_2$ Polymer System Containing 87% by Weight Wet Aggregate and 13% Polymer by Weight

| Specimen No. | Water Content % | 1 hr Compressive Strength 24° C., psi |
|---|---|---|
| 1 | 0 | 5100 |
| 2 | 4 | 4900 |
| 3 | 6 | 4300 |
| 4 | 8 | 3800 |
| 5 | 10 | 1850 |

The ambient temperature at which the in situ polymerization occurs also effects the 1 hour compressive strength which varies within the range of 4200 psi at −20° C. to 5300 psi at 20° C. for dry aggregate compositions, and varies within the range of 2100 psi at −20° C. and 3300 psi at 20° C. for wet and frozen aggregates containing 8% water.

The results for compressive, bending, tensile, and shear bond strength tests, and water absorption measurements for FA-PC containing dry and wet aggregate (7.5% by weight water content) after curing for 3 days in air at about 24° C. are summarized in Table 5. The compressive strength for FA-PC specimens having a 13% by weight polymer content and an 87% by weight aggregate content, using dry aggregate, was 7600 psi, which is only 1.4 times higher than that obtained for specimens containing aggregate having a 7.5% by weight water content. The 3 day strength of specimens in the presence of 7.5% by weight water showed a value of 5410 psi, which corresponds to an improvement of about 69% over the 1 hr strength

TABLE 5

Mechanical Properties of FA—PC Containing Dry and Wet Aggregate (7.5% water content) after a 3-Day Cure in Air at 24° C.

| W/A + W, % | Compressive[a] Strength psi | Bending[b] Strength psi | Tensile[a] Strength psi | Shear Bond Strength psi | Water[c] Absorption % |
|---|---|---|---|---|---|
| 0 | 7600 | 1680 | 962 | 220 | 1.20 |
| 7.5 | 5410 | 1452 | 769 | 185 | 1.85 |

Note:
Average value of three specimens.
[a]2.2-cm-diam × 4.4-cm-long cylinders
[b]1.25-cm-square × 7.5-cm-long beams
[c]Immersed in water for 7 days at 25° C.

The 3 day bending and tensile strength results obtained for samples containing dry aggregate were only 1.2 to 1.3 times higher than those for the specimens containing an equal amount of wet aggregate. Consequently, it is evident from the strength test results that when used as a binder in PC, the FA monomer—TCT initiator—$ZnCl_2$ promoter formulations yield high-quality composites and can be used with aggregate having a water content up to about 7.5% by weight.

The shear bond strength of FA-PC in conjunction with dry aggregate was a little higher (220 vs. 180 psi) than that of PC containing wet aggregate.

The water absorption of dry aggregate—filled FA-PC specimens was somewhat lower (1.20 vs. 1.85%) than that of wet aggregate—filled FA-PC. However, the water absorption of 1.20% obtained from the dry aggregate is a relatively high value compared with that of less than 1% for vinyl-type PC specimens. This is believed to be due to the free $H_2O$ produced as a by-product of the FA polymerization process. The free $H_2O$ under the high reaction temperatures may then produce an active molecular movement which in turn produces many capillary pores in the PC.

From the results of the mechanical properties described above, aggregate having a water content of less than 8.0% by weight was used effectively in a rapid-setting-type FA-PC system. Wet aggregate cannot be used in conventional MMA and UP-PC systems as previously discussed. It appears that the FA monomer—TCT initiator—$ZnCl_2$ promoter formulation can be used directly as a binder for ordinary wet aggregate which may be stored in the field as a substitute for the anhydrous cement binder used in portland cement concretes.

Since water has a relatively high thermal conductivity (about 6.00 cal g $hr^{-1}$ $cm^{-1}$ $°K^{-1}$), its presence in uncured FA-PC specimens may restrain the initial polymerization rate. This is due to the ready absorption by water of energy produced in the polymerization process of FA-PC. It appears that the restrictive action of the free water increases with an increase in the amount of water used. Therefore, approximate estimates for the quantity of the heat of polymerization absorbed by the free water were performed by using a differential scanning calorimeter (DSC) technique, which appears to be the most effective method for obtaining quantitative information on the curing process of thermosetting resins.

By experimentation, the effect of 2.5% by weight and 5.0% by weight water content on the kinetics of thermal polymerization of FA-PC was evaluated from the values of the activation energies, Ea, for the polymerization. The amount of TCT catalyst used was 1.5% by weight of FA monomer. The total area under the exothermic peaks of the DSC thermogram represents the total quantity of heat liberated upon conversion of monomer to polymer during the thermal condensation polymerization. The thermogram of the thermally induced polymerization of FA-PC specimens having 5% by weight water content shows an exotherm corresponding to an onset temperature of about 32° C. The peak exotherm energy of about 4.5 mcal/sec occurs at 43° C.

The thermogram for FA-PC containing 2.5% by weight water content is characterized by an exothermal curve showing the onset of polymerization at about 17° C., along with the exothermal kinetic energy peak at about 28° C. producing about 5.8 mcal/sec. The curves also suggest that the exothermal kinetic energy produced during the thermal condensation polymerization of FA-PC in the presence of 2.5% by weight water is about 27% greater than that when the water content is 5.0% by weight. This seems to demonstrate that the polymerization rate of FA-PC in the presence of a water phase is dependent on the amount of water added to the aggregate.

The activation energy, Ea, for the thermal polymerization of FA-PC in the presence of 5.0% by weight water was calculated to be 52.8 kcal/mole. The value of Ea (73.1 kcal/mole) obtained for samples having a 2.5% by weight water content is 20.3 kcal/mole higher than for the samples containing 5.0% by weight water. This means that a thermal polymerization energy of about 8.0 kcal/mole is absorbed by the addition of 1% by weight of water. It is evident from this data that the presence of free water which has a considerably larger capacity for the absorption of energy during the polymerization of FA-PC performs a significant function as an inhibitor in the FA-TCT-$ZnCl_2$ polymerization system. Therefore, the addition of a relatively large amount of initiator and promoter in the FA-PC system is required for a rapid and complete condensation-type polymerization reaction to occur.

Comparative flammability results after curing polymer concrete composites containing dry aggregate for 3 days at 24° C., as summarized in Table 6, show that the FA-PC did not support combustion after removal of the flame source. Similar results were obtained for the FA-PC containing aggregate with a water content of 7.5% by weight.

TABLE 6

Determination of the Relative Flammability of Polymer Concrete Composites

| | Polymer Concentration, by Weight | Average of 10 Specimens |
|---|---|---|
| Furfuryl alcohol | 13.2 | Nonburning by this test; two 30-sec ignitions |
| Methylmethacrylate | 11.0 | Self-extinguishing flame; travels about 2.0 cm in 1.0 min |
| 60% styrene - 40% TMPTMA | 12.1 | Self-extinguishing flame; travels about 2.4 cm in 1.5 min |
| 50% polyester - 50% styrene | 18.0 | Self-extinguishing flame; travels about 3.0 cm in 2.0 min |

TABLE 6-continued

Determination of the Relative Flammability of Polymer Concrete Composites

| Polymer Concentration, by Weight | Average of 10 Specimens |
|---|---|

On the other hand, MMA, 60% by weight St—40% by weight TMPTMA, and 50% by weight UP—50% by weight St PCs are self-extinguishing. However, with these PCs, disintegration occurred at the point of flame application when the burner flame was sustained for 30 sec. A portion of the polymer pyrolyzed, and the remainder consisting of aggregate dropped off the test specimen. After removal of the burner flame, deformation was noted to the extent of burning.

The results of the above tests indicate that the FA-PC has a great potential for application in building blocks, wall panels, floor tiles, and ceilings, and particularly as a quick repair material for highways, runways and bridges where disruption of traffic should be kept at a minimum. These results show that furfuryl alcohol (FA) monomer, polymerized by the addition of (TCT) initiator and a metal salt such as zinc chloride as promoter, can be used as a quick-setting binder material when combined with an aggregate having a water content up to about 8% by weight. The TCT initiator—$ZnCl_2$ promoter system has a significant effect on the polymerization rates and the improvement in initial strength of the FA-PC containing wet aggregate. A compressive strength greater than 2000 psi for PC containing aggregate with a water content of 8.0% by weight was obtained within 1 hr at 24° C. by the addition of at least 1%, preferably 1.5% TCT, and 20–80%, preferably 60%, $ZnCl_2$ by weight of FA monomer. The free water existing in PC, which absorbs thermal polymerization energy at the rate of about 8.0 kcal/mole for each 1% of water by weight of aggregate, acts as an inhibitor for the FA-TCT-$ZnCl_2$ polymerization system.

The foregoing description of a preferred embodiment of the invention has been presented for the purposes of illustration and description. It is not intended to be exhaustive or to limit the invention to the precise form disclosed, and obviously many modifications and variations are possible in light of the above teaching. The specific examples were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A quick setting, water-compatible polymer concrete composition comprising about 8–20% by weight of a furfuryl alcohol monomer, 78–92% of an aggregate system having a maximum pH of about 8 containing filler and 0–8% by weight water, about 1–10% trichlorotoluene based on the weight of said monomer, and about 20–80% metal salt, selected from the class consisting of $SnCl_4$, $ZnCl_2$ and $AlCl_3$, based on the weight of said monomer, to initiate and promote polymerization within one hour at a temperature within the range of −20° C. to 40° C., in the production of a polymer concrete having a one hour compressive strength greater than 2000 psi.

2. A composition in accordance with claim 1, wherein said aggregate system is a mixture of silica sands having a particle size of 1.19 to 0.149 mm and a non-basic filler.

3. A composition in accordance with claim 1, wherein said aggregate system can be in dry, wet or frozen form.

4. A composition in accordance with claim 1, wherein the metal salt is $ZnCl_2$.

5. A composition in accordance with claim 1, wherein the trichlorotoluene constitutes 1.5% by weight of the furfuryl alcohol monomer.

6. A composition in accordance with claim 4, wherein the $ZnCl_2$ constitutes 60% by weight of the furfuryl alcohol monomer.

7. A quick setting, water-compatible polymer concrete composition comprising about 8–20% by weight of a furfuryl alcohol monomer, 78–92% of an aggregate system having a maximum pH of about 8 containing filler and 0–8% by weight water, and 1.5% trichlorotoluene and 60% zinc chloride based on the weight of said monomer to initiate and promote polymerization within one hour at a temperature within the range of $-20°$ C. to $40°$ C., in the production of a polymer concrete having a one hour compressive strength greater than 2000 psi.

8. A method of preparing a quick setting, water-compatible polymer concrete composition containing about 8–20% by weight of a furfuryl alcohol monomer 78–92% of an aggregate system having a maximum pH of about 8 containing filler and 0–8% by weight water, and about 1–10% trichlorotoluene and about 20–80% metal salt, selected from the class consisting of $SnCl_4$, $ZnCl_2$ and $AlCl_3$, based on the weight of said monomer, which comprises mixing aggregates in wet or frozen form with the metal salt, separately mixing the furfuryl alcohol monomer with the trichlorotoluene, and then mixing said aggregate mixture with said monomer mixture at ambient temperatures within the range of about $-20°$ C. to about $40°$ C. to effect polymerization of said monomer in situ within one hour and recovering a polymer concrete having a one hour compressive strength above 2000 psi.

9. A method of claim 8, wherein the metal salt is added in the form of an aqueous solution directly to the aggregate.

10. A method of claim 8, wherein the metal salt is added directly to the frozen aggregate in the form of a solid.

11. The method of claim 10 wherein the metal salt is in the form of a finely divided dry powder.

* * * * *